United States Patent
Pollock et al.

(10) Patent No.: US 7,090,261 B2
(45) Date of Patent: Aug. 15, 2006

(54) ANIMAL WATERING SYSTEM WITH KEYED COMPONENTS

(75) Inventors: Eugene B. Pollock, Assumption, IL (US); James M. Adermann, Altamont, IL (US)

(73) Assignee: The GSI Group, Inc., Assumption, IL (US)

( * ) Notice: Subject to any disclaimer, the term of this patent is extended or adjusted under 35 U.S.C. 154(b) by 0 days.

(21) Appl. No.: 10/765,633

(22) Filed: Jan. 26, 2004

(65) Prior Publication Data

US 2005/0160994 A1   Jul. 28, 2005

(51) Int. Cl.
*F16L 17/00* (2006.01)

(52) U.S. Cl. .................. 285/369; 285/330; 285/93; 285/5

(58) Field of Classification Search ............ 285/369, 285/374, 404, 330, 93, 5
See application file for complete search history.

(56) References Cited

U.S. PATENT DOCUMENTS

| | | | |
|---|---|---|---|
| 975,138 A * | 11/1910 | Lancaster | 285/81 |
| 1,762,766 A * | 6/1930 | De Garay | 285/331 |
| 2,226,547 A * | 12/1940 | Boynton | 285/89 |
| 2,420,838 A * | 5/1947 | Osborn | 285/37 |
| 2,562,014 A * | 7/1951 | Buhayar | 285/113 |
| 2,769,647 A | 11/1956 | Harstick et al. | |
| 3,327,945 A * | 6/1967 | Pfister | 236/45 |
| 3,664,305 A | 5/1972 | Hart et al. | |
| 3,963,268 A | 6/1976 | Widdicombe | |
| 4,516,533 A | 5/1985 | Mallinson | |
| 4,610,063 A | 9/1986 | Steudler, Jr. | |
| 4,753,196 A | 6/1988 | Lack et al. | |
| 4,794,881 A | 1/1989 | Rader | |
| 4,892,061 A | 1/1990 | Steudler, Jr. | |
| 5,063,878 A | 11/1991 | Hostetler | |
| 5,097,798 A | 3/1992 | Little | |
| 5,184,570 A | 2/1993 | Hostetler | |
| 5,230,302 A | 7/1993 | Steudler, Jr. | |
| 5,239,944 A | 8/1993 | Hostetler | |
| 6,105,537 A | 8/2000 | Coen et al. | |
| 6,494,493 B1 | 12/2002 | Baruh | |
| 6,520,547 B1 * | 2/2003 | Robinson | 285/330 |
| 6,557,908 B1 * | 5/2003 | Houtschilt et al. | 285/420 |
| 6,619,231 B1 | 9/2003 | Darby et al. | |

FOREIGN PATENT DOCUMENTS

EP   0519149   12/1992

* cited by examiner

*Primary Examiner*—David Bochna
(74) *Attorney, Agent, or Firm*—Polster, Lieder, Woodruff & Lucchesi, L.C.

(57) ABSTRACT

A watering system for a poultry house comprises a watering line which is suspended from a stabilizing bar by means of a clip. The watering line is comprised of a plurality of pipe segments connected together by a coupling mechanism. The coupling mechanism includes a keying element or portion which is formed in the pipe segment at a predetermined location relative to the drinker opening in the pipe segment. The coupling mechanism thus rotationally fixes adjacent pipe segments relative to each other such that the drinker openings of the pipes segments in the watering line are rotationally aligned and fixed relative to each other. The clip includes a boot which engages a projection on the pipe segment (preferably the drinker saddle) to key the pipe segments relative to the stabilizing bar.

20 Claims, 10 Drawing Sheets

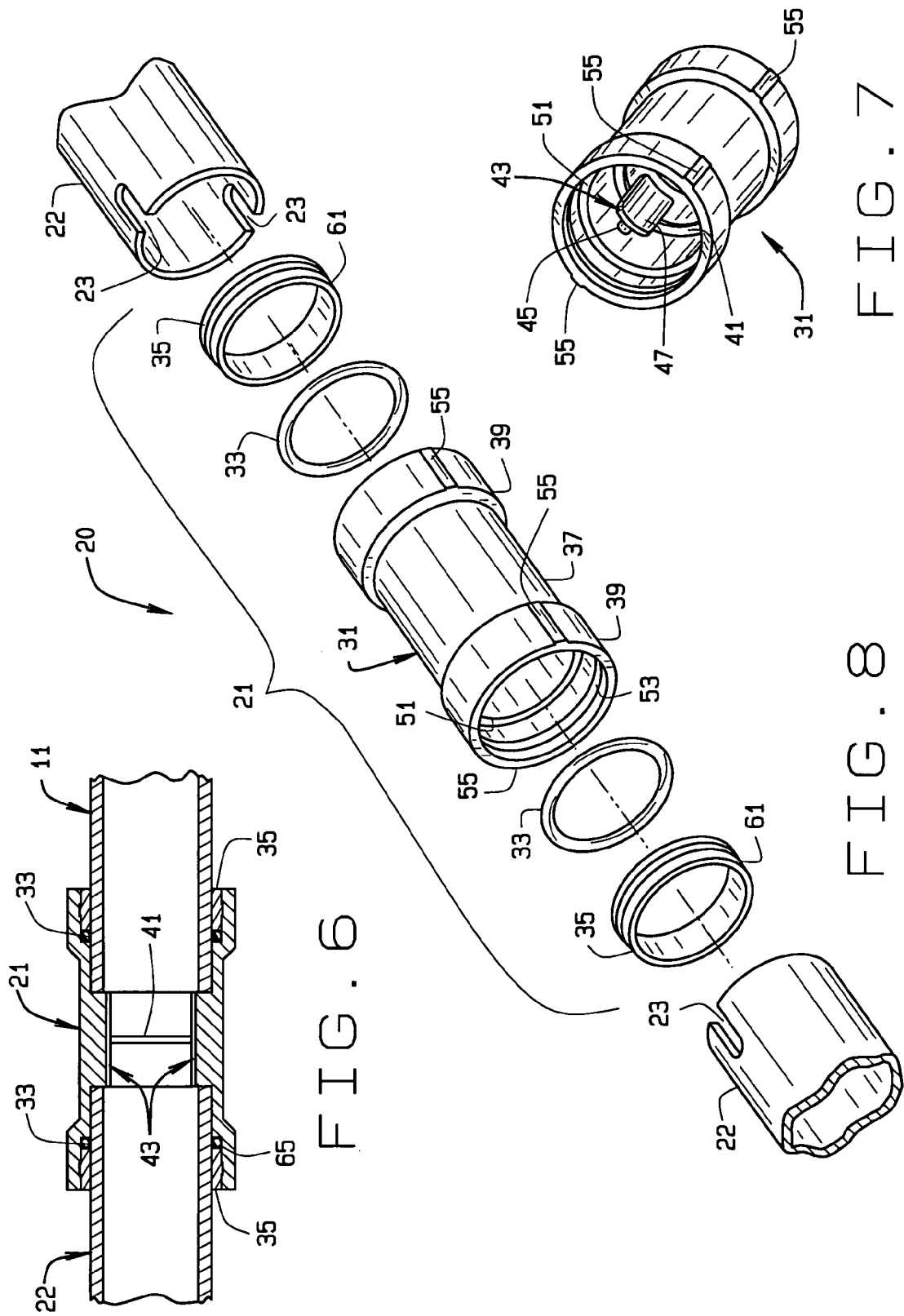

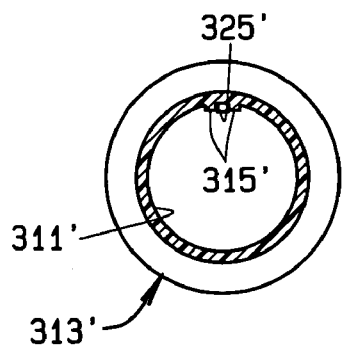
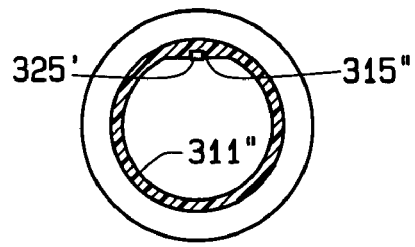
FIG. 21A     FIG. 21B
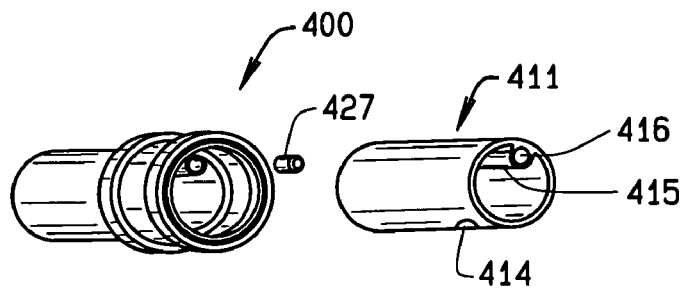
FIG. 22
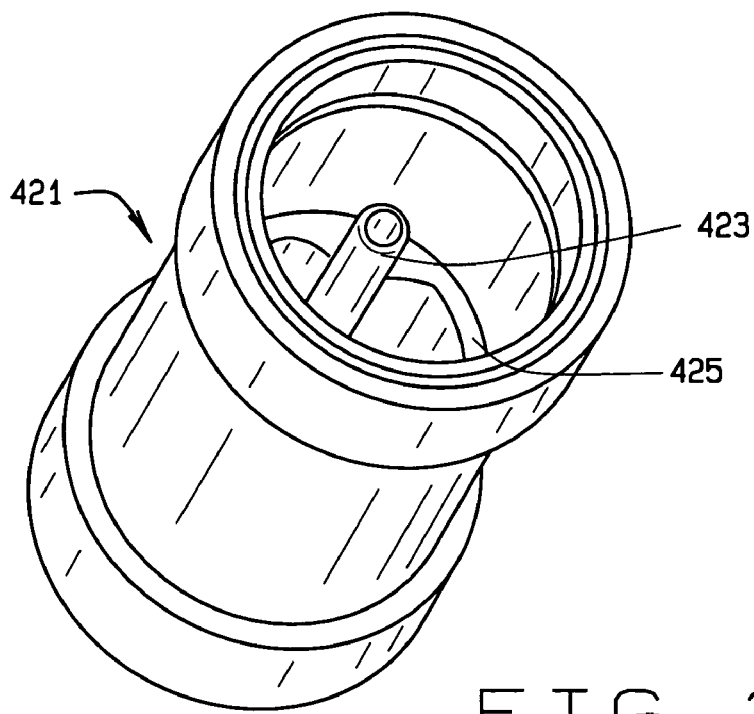
FIG. 23

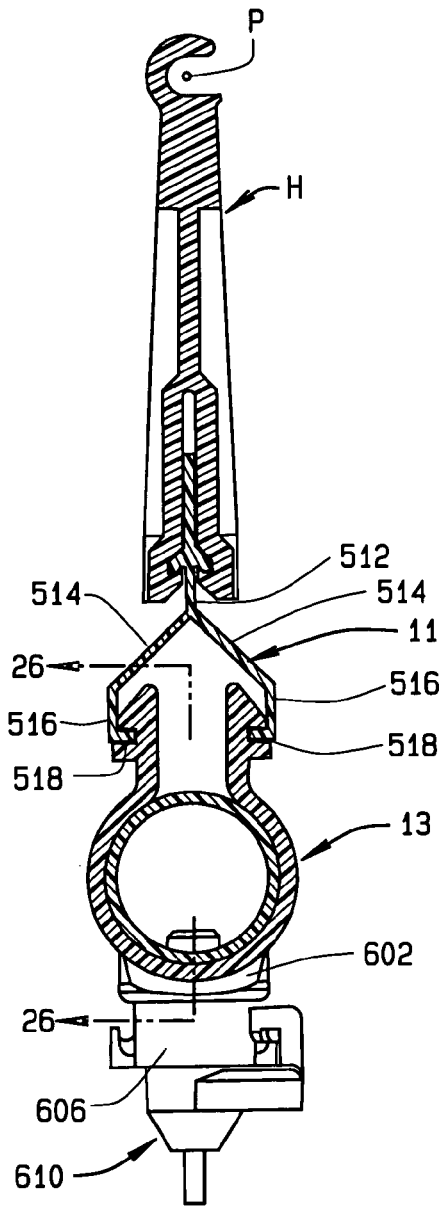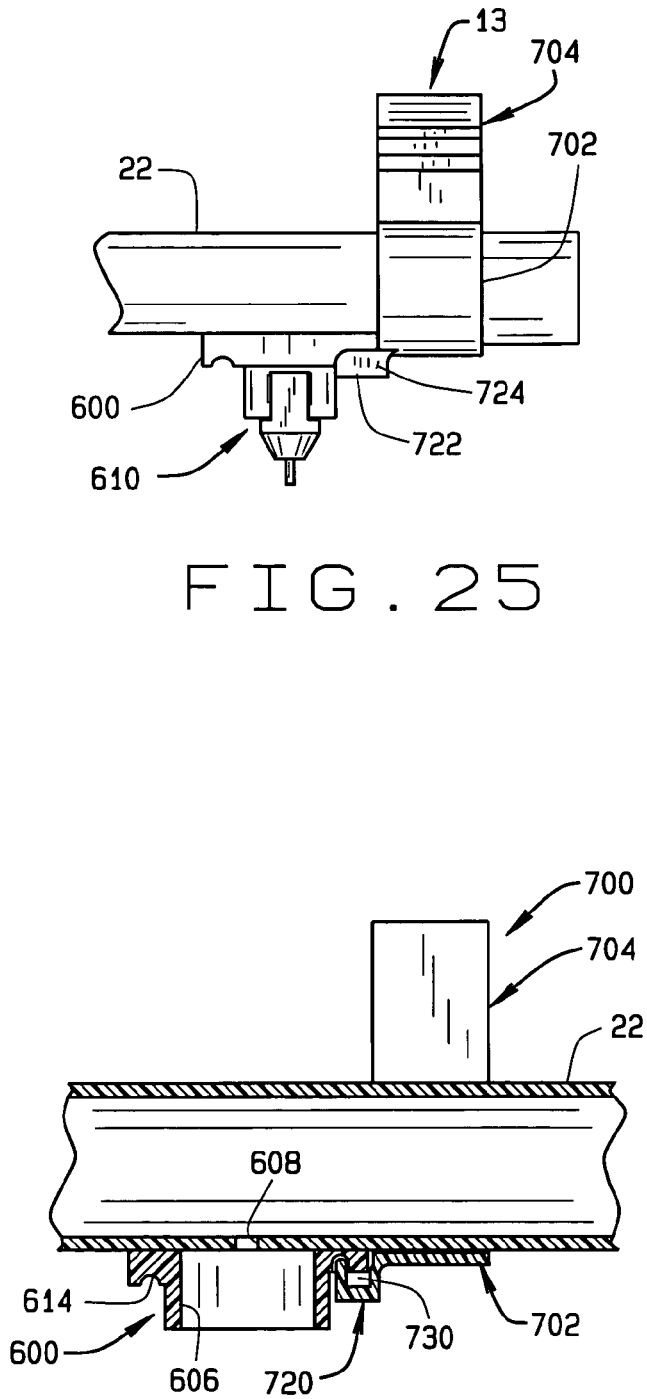
FIG. 24
FIG. 25
FIG. 26

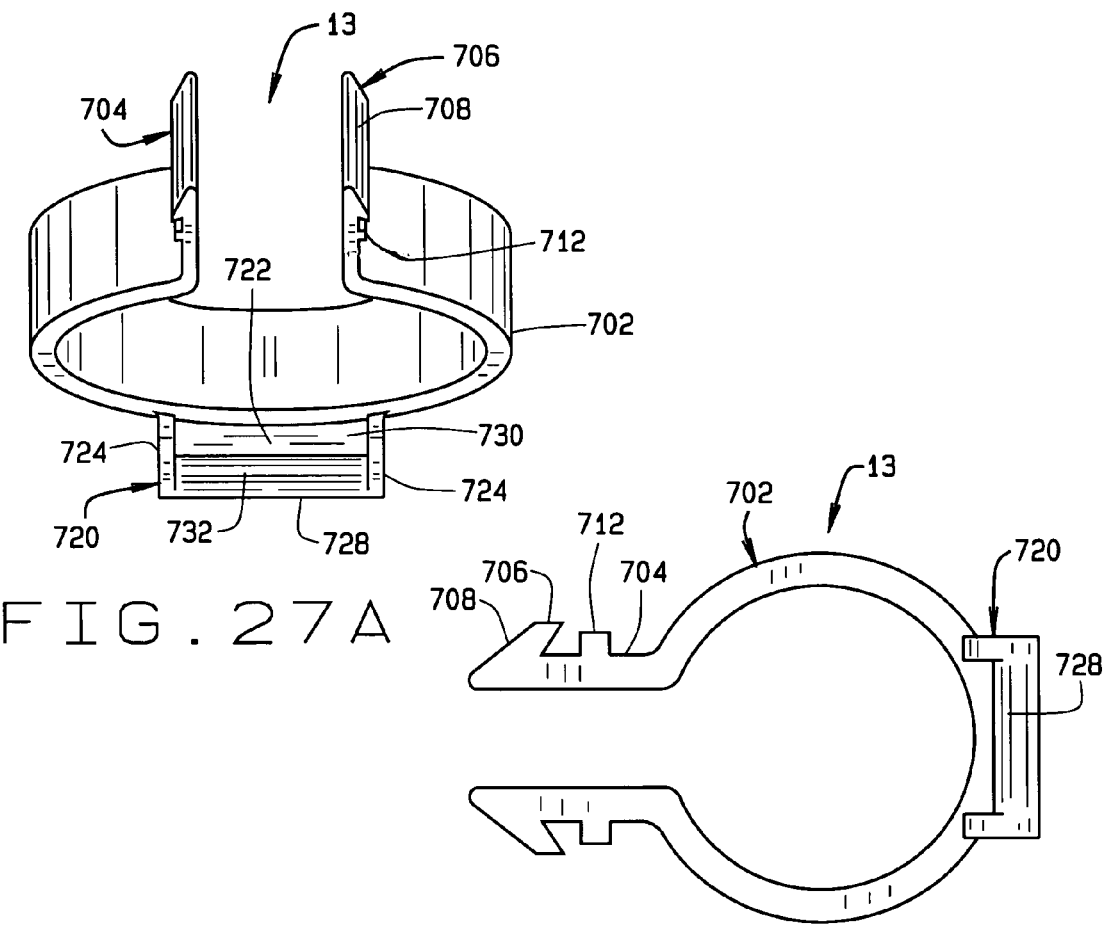
FIG. 27A
FIG. 27B
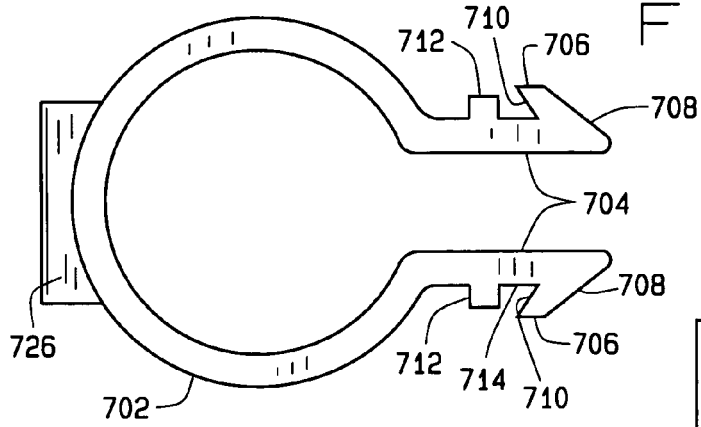
FIG. 27C
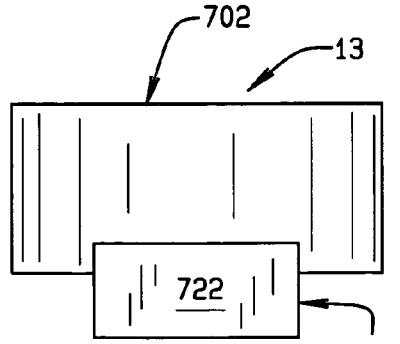
FIG. 27D

ANIMAL WATERING SYSTEM WITH KEYED COMPONENTS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to animal watering systems, such as used in poultry houses, and, in particular, to couplers used to rotationally align pipe segments one to another and connectors for connecting the water pipe segments to a stabilizer bar to ensure that the hang point of the water line is 180° from the drinker pin or nipple and to further prevent twisting and/or torquing of pipe segments relative to each other. Although the invention is described below in connection to poultry house watering systems it will be apparent to those skilled in the art that the invention has applicability to piping for carrying fluid material, such as liquid, gas, or even fluidized particulate material, and, in particular to such piping which is suspended.

A typical animal watering system S, such as is used in poultry houses, is shown in FIG. 1. The watering system S includes a water regulator R which is connected to a supply of water WS to reduce the line pressure of the supply water. Watering lines WL extend from the regulator and have drinkers spaced therealong. The watering lines WL can be hundreds of feet long, and hence, are generally made of pipe segments P which are connected together. The watering lines WL are generally constructed of plastic piping, such as ABS piping. To prevent the water pipes from flexing, for example, under their own weight, the plastic water pipes are generally suspended stabilizer bars SB by means of clips C. A segment of a prior art watering system is shown in FIG. 2. This watering system employs an extruded aluminum stabilizing bar to which the clip C is rigidly fixed. The prior art clip C, used in this system is shown in FIG. 3. In this watering system, a hanger H is connected to the top of the stabilizer bar. A cable extends between the hanger H and a support beam to suspend the watering system in the animal house H. In a second watering system, the stabilizer bar is made from metal round tubing. The clip in such a system has been generally S-shaped, with a top portion of the S frictionally grasping the round tubing stabilizer bar B and the bottom of the S frictional grasping the watering line WL. In this second example, the hanger H and clip C are combined together. As discussed briefly below, neither the C-shaped clip of FIG. 3, or the S-shaped clip used with the tubular stabilizing bar prevent the pipe segments from being rotated relative to the stabilizing bar. This allows for the assembler to adjust the rotational position of the pipe segments so that the drinkers (or drinker saddles) all face downwardly.

The individual pipe segments P of the watering system S are placed in fluid communication with each other using a coupler. The coupler includes O-rings to form a fluid tight seal between two adjacent pipe segments. Generally the pipes either have the drinkers already connected thereto or have mounting blocks fixed to the pipe to receive the drinkers prior to connecting the pipes together. To assemble the pipes together to form the watering line of the watering system, the individual pipes are placed in fluid communication with each other using couplers which form a fluid tight seal between adjacent pipe segments. The couplers frictionally engage the pipe segments, and hence, adjacent pipe segments can be rotated relative to each other. Importantly, the drinkers or drinker saddles D on an individual pipe segment are all rotationally aligned. The drinker operation is sensitive to the angle at which the drinker pin is positioned. Ideally, the drinker pins are normally in a vertical position, and the drinker pins of all the pipe segments are vertical.

The ability to rotate the pipe segments in the coupler allows the assembler to rotationally align the drinkers of adjacent pipe segments, and hence, to rotationally align the drinkers along a watering line, so that all the drinker pins are substantially vertical. To maintain the rotational position of pipe segments, a second clamp C2 is provided, as seen in FIG. 2. The clamp C2 includes a nut and bolt which pull together two sections of the clamp to tightly and frictionally engage both the pipe segment P and the stabilizing bar B. To assemble a watering line, such as the watering line of FIG. 2, a stabilizing bar (or section thereof) is suspended using hangers H. The using clips C, a pipe segment is suspended from the stabilizing bar. The pipe segment is then rotated within the clips C so that the drinker saddles D face downwardly. When the proper rotational position of the pipe segment is obtained, the clamp C2 is tightened about the pipe segment. A coupler is placed on the end of the pipe segment, and a second pipe segment is added to the water line. This second pipe segment must be rotationally positioned in its clamps, and then fixed in place by means of a clamp C2. This process continues until the entire water line is completed. After the water line has been completed, the assembler must then check the rotational of the drinkers to ensure that they are all aligned. If any are out of alignment, and do not face downwardly, as is necessary, the pipe segments must be adjusted. The adjustment of one pipe segment may affect the rotational position of its adjacent pipe segments. As can be appreciated, the process of assembly a water line so that the drinkers are all properly positioned can be a time consuming and difficult procedure.

As chicks grow, they tend to peck harder on the drinker pins. This pecking can create a torque force on the pipe segments which can cause pipe segments to rotate relative to each other. In order to help prevent rotation of pipe segments relative to each other, the clips C and C2 frictionally engage the pipe segments, as noted above. Even if the clips grasped the water line tightly when the water line is assembled, over time, the frictional grip of water pipe by the clip lessens, thereby allowing for rotation of pipe segments relative to each other. Additionally, birds passing under the drinkers could rotate the pipe segments. For water systems using the tubular stabilizing bar, not only can the birds manage to rotate the pipe segments relative to each other, they can knock the pipe segments, such that they are no longer fully gripped by the S-shaped clips. In this case, the pipe segments are no longer linearly aligned, and become slightly snaked.

Another clip that is currently available is the scissors-type clip shown in FIGS. 4 and 4A. This scissors-type clip is for use with tubular stabilizer bars and includes a hanger portion to connect the clip to a cable. This scissors-type clip is movable between an open and a closed position. In the open position, the clip can be positioned about the water pipe and the stabilizer bar. The clip is then closed to independently encircle the water pipe segments and the stabilizer bar. This clip includes a boot which engages the drinker saddle to fix the rotational position of the water pipe relative to the stabilizer bar. This scissors-type clip does not frictionally grip the tubular stabilizing bar, and the stabilizing bar can rotate within the clip. Hence, the clip does not prevent pivoting of the water line about the stabilizing bar. Stated differently, the stabilizing bar can form an axle about with the water line can pivot. Hence, birds pecking at the drinkers or walking under the water line can still cause individual pipe segments to pivot relative to the other pipe segments in the water line.

Because the pipe segments can be rotated relative to each other during assembly and even during use of the drinkers by the birds, and because the mounting clip has to grasp the watering pipe so tightly, assembly of a watering line has, heretofore, been very difficult. It would be desirable to provide a coupler and a clip that will reduce the difficulty of rotationally aligning pipe segments of a watering line to make assembly of a watering line easier, and which will reduce the possibility of individual pipe segments being rotated during use of the drinkers by the birds.

BRIEF SUMMARY OF THE INVENTION

A watering system for a poultry house comprises a watering line which is suspended from a stabilizing bar by means of a clip. The stabilizing bar, in turn, is suspended from suspension members in an animal house by cables which are connected to a hang point on the hangers. The watering line is comprised of a plurality of pipe segments connected together by a coupling mechanism of the present invention. The pipe segments each including at least one drinker opening. As is known, a drinker saddle is fixed to the pipe at the drinker opening to mount a drinker to the pipe segment (or a drinker is directly mounted to the pipe segment at each drinker opening). The coupling mechanism is formed at a predetermined location relative to the drinker opening and rotationally fixes adjacent pipe segments relative to each other such that the drinker openings of the pipes segments in the watering line are rotationally aligned and fixed relative to each other. The pipe segments also include a projection extending outwardly from an outer surface of said pipe segments. As described below, the preferred projection is the drinker saddle.

In one aspect of the invention, the stabilizing bar includes an axially extending shoulder. The clips which suspend the watering line from the stabilizing bar each include a pipe receiving section, a pair of arms extending from the pipe receiving section, and a boot on the pipe receiving section. The arms define a groove sized and shaped to engage the stabilizing bar shoulders. The boot defines a pocket and is positioned on the clip pipe receiving section to engage the pipe segment projection to positionally fix the pipe segment relative to the clip.

The coupling mechanism keys and rotationally fixes the pipe segments of the water line one to another to ensure alignment of the drinker openings and to prevent rotational movement of the pipe segments relative to each other. Additionally, the clip keys the pipe segments to the stabilizing bar to prevent rotational movement of the pipe segments relative to the stabilizing bar. The clip and the coupling mechanism allow for the water line to be assembled easily and without the use of tools.

In another aspect of the invention, the coupling mechanism comprises a keying element which engages ends of the pipe segments to rotationally align and rotationally fix adjacent pipe segments relative to each other.

In one embodiment, the keying element comprises end formations on the pipe segments. The end formations comprise at least one arcuate or curved segment extending axially from the ends of the pipe segments. The end formations of adjacent pipe segments intermesh to rotationally align and rotational fix adjacent pipe segments relative to each other.

In the first example, the keying element is integral with the pipe segment. The keying element can also be separate from the pipe segment. In this instanced, the pipe segments each include an opening at opposite ends thereof to receive or engage the keying element.

In one embodiment, keying element is a pin, and the opening comprises a bore extending inwardly from an end of the pipe segment. The pipe segment opening, in this instance, includes an axially extending bore, which can be formed in the wall of the pipe segment, or which can be formed in an axially extending rib. The rib can be formed on an inner surface of the pipe segment, and, if desired, can extend the entire length of the pipe segment.

In another embodiment, the keying element is in the form of a plate. The plate comprises opposed edges and a projection on at least one of said opposed edges (and preferably on both of said opposed edges). The pipe segment opening comprises a slot extending inwardly from an end of the pipe segment. The slot is sized to receive the plate projection, and the plate projection has a length such that it extends from the slot of one pipe segment into the slot of an adjacent pipe segment. The slot can be in the form of a groove formed, for example, on the inner surface of the pipe segment. Alternatively, the slot can extend through the pipe segment wall.

The watering system also includes a coupler which forms a water tight seal between adjacent pipe segments. The keying element can be formed integrally with the coupler, and can extend from a surface of the coupler.

In one example, the keying element comprises a rod. The water pipe segments including an axially extending bore positioned to be aligned with the coupler rod. The rod can be hollow, in which case, the coupling mechanism also includes a pin sized to be received in, and extend between, the hollow rod and the pipe segment bore. Alternatively, the rod can itself be received in the water pipe bore. The water pipe bore can be formed on an axially extending rib in the pipe section.

In another embodiment, the keying element comprises a rib extending axially along a surface of the coupler, and the opening in the pipe segment comprises a slot extending inwardly from an end of the pipe segment. The keying element further includes an axially extending cap on the rib. The cap has a bottom surface which extends outwardly from opposite sides of the rib, such that the key has a generally T-shaped configuration in end elevation. The key rib has a height slightly greater than the annular width of the pipe segment; whereby, the key cap will sandwich the pipe segment between the key cap and the coupler inner surface.

The coupler also includes a stop, preferably in the shape of a circumferential rib, on an inner surface of the coupler body. The stop is substantially perpendicular to the key and is positioned in the coupler body to be positioned approximately midway along the length of the key.

The coupler can also be provided with a key position indicator on an outer surface of the coupler body. The key position indicator has an angular position on the body corresponding to the angular position of the key within the body.

BRIEF DESCRIPTION OF THE SEVERAL VIEWS OF THE DRAWINGS

FIG. 6 is an exploded view of a first illustrative embodiment of a pipe coupling system of the present invention for coupling and rotationally fixing two pipe segments together in a predetermined rotational aligned position;

FIG. 7 is a cross-sectional view of the pipe coupler connecting two pipe segments together;

FIG. 8 is a perspective view of the coupler;

FIGS. 21A–B are cross-sectional views of alternative constructions of the coupler system of FIG. 18;

FIG. 22 is a perspective view of a fifth illustrative coupler system for use in coupling and rotationally fixing two pipe segments together in a predetermined rotational aligned position;

FIG. 23 is an enlarged perspective view of a coupler used with the coupling system of FIG. 22;

FIG. 24 is a cross-sectional view of watering pipe segment suspended from an inverted Y-shaped stabilizing bar by an illustrative clip of the present invention which ensures that that watering line hang point is 180° from the drinker pin;

FIG. 25 is a side-elevational view of the clip positioned on the watering pipe segment;

FIG. 26 is a cross-sectional view taken along line 26—26 of FIG. 24, the drinker being removed for purposes of clarity; and FIGS. 27A–D are top, front, back, and bottom plan views of an illustrative clip of the present invention which connects the watering pipe to the support beam such that the watering pipe cannot rotate relative to the support beam.

Corresponding reference numerals will be used throughout the several figures of the drawings.

DETAILED DESCRIPTION OF THE INVENTION

Figure 1:
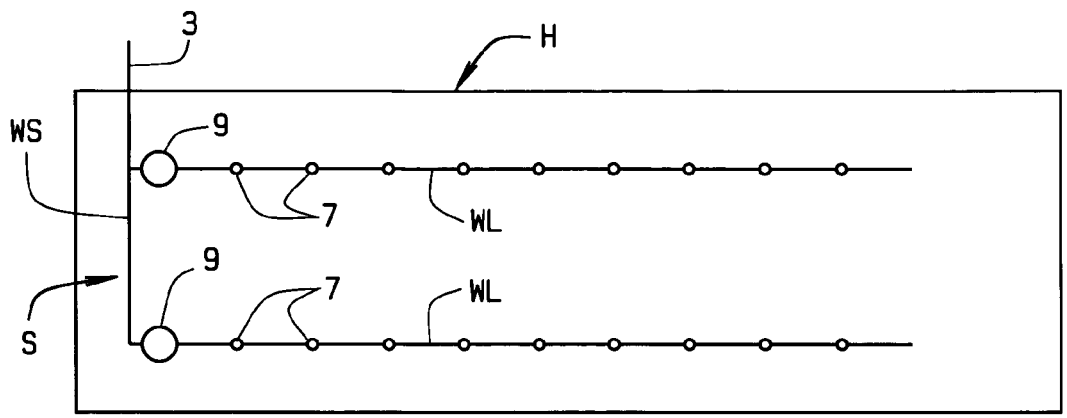
FIG. 1 is a diagrammatic view of a poultry house having a watering system including a pressure regulator which supplies low pressure water to an elongate watering pipe having a series of drinking stations or drinkers spaced therealong.
Figure 2:
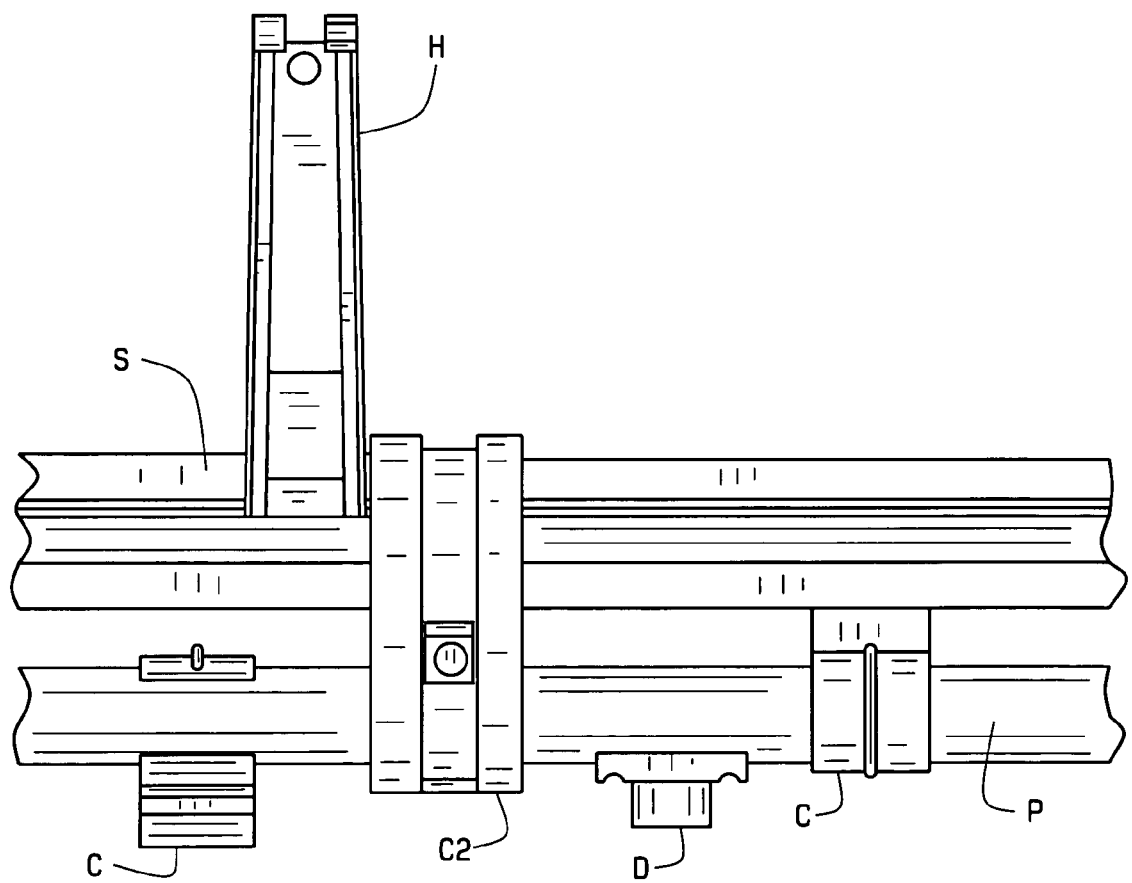
FIG. 2 is an elevational sectional view of a prior are watering system.
Figure 3:
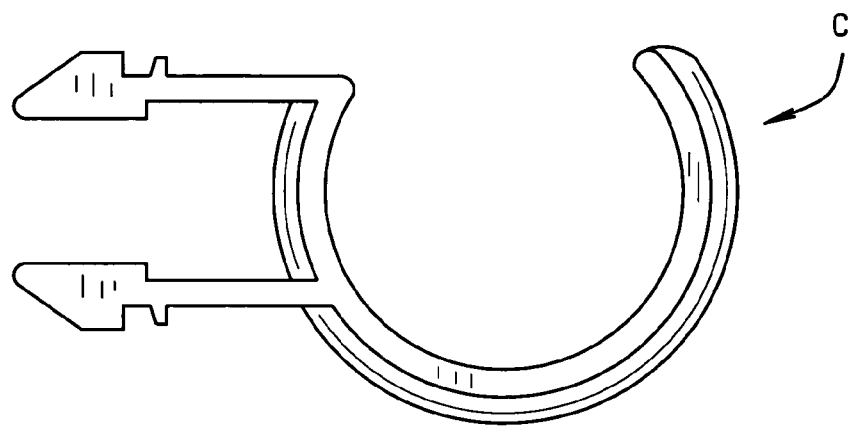
FIG. 3 is an elevational view of a prior art clip, used to suspend a pipe segment from an inverted Y-shaped stabilizer bar.
Figure 4:
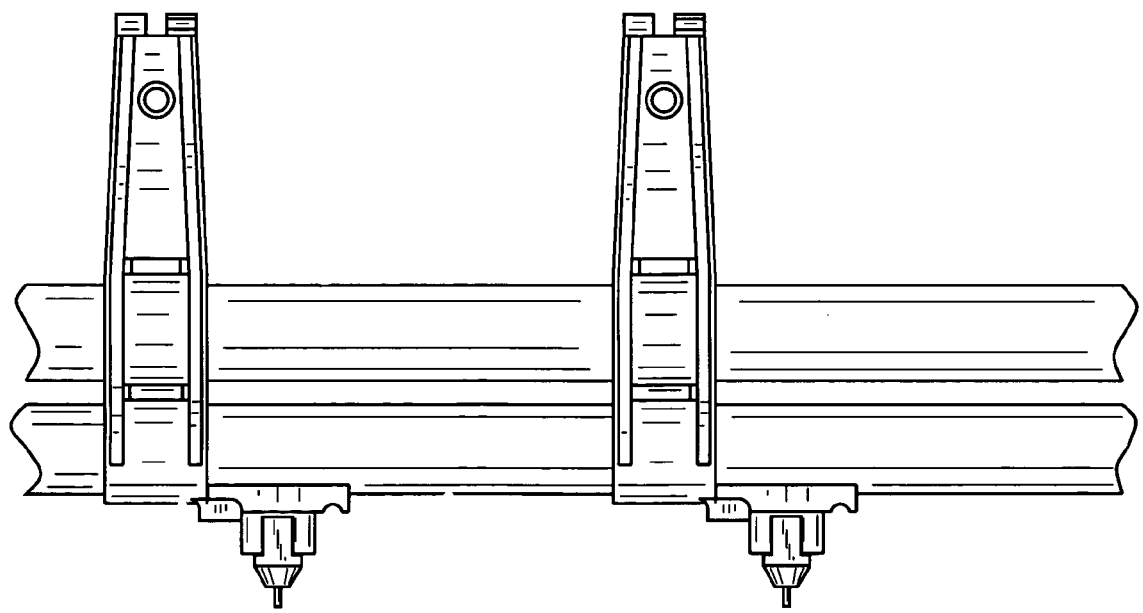
FIG. 4 is an elevational view of a portion of a water line incorporating a scissors-type clip to suspend the water line from a tubular stabilizing bar.
Figure 4A:
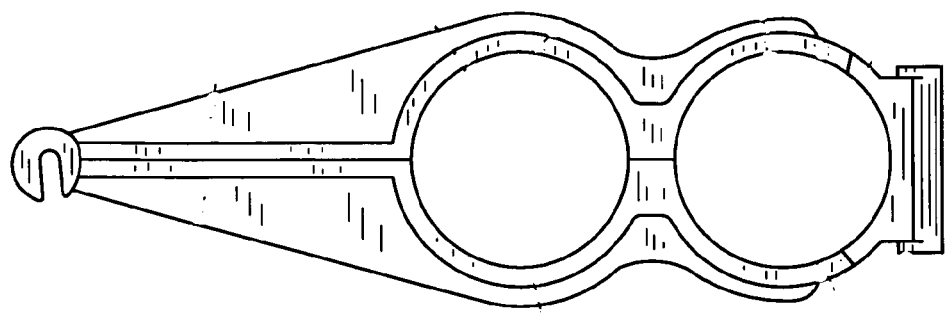
FIG. 4A is a side elevational view of the scissors-type clip.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 5:
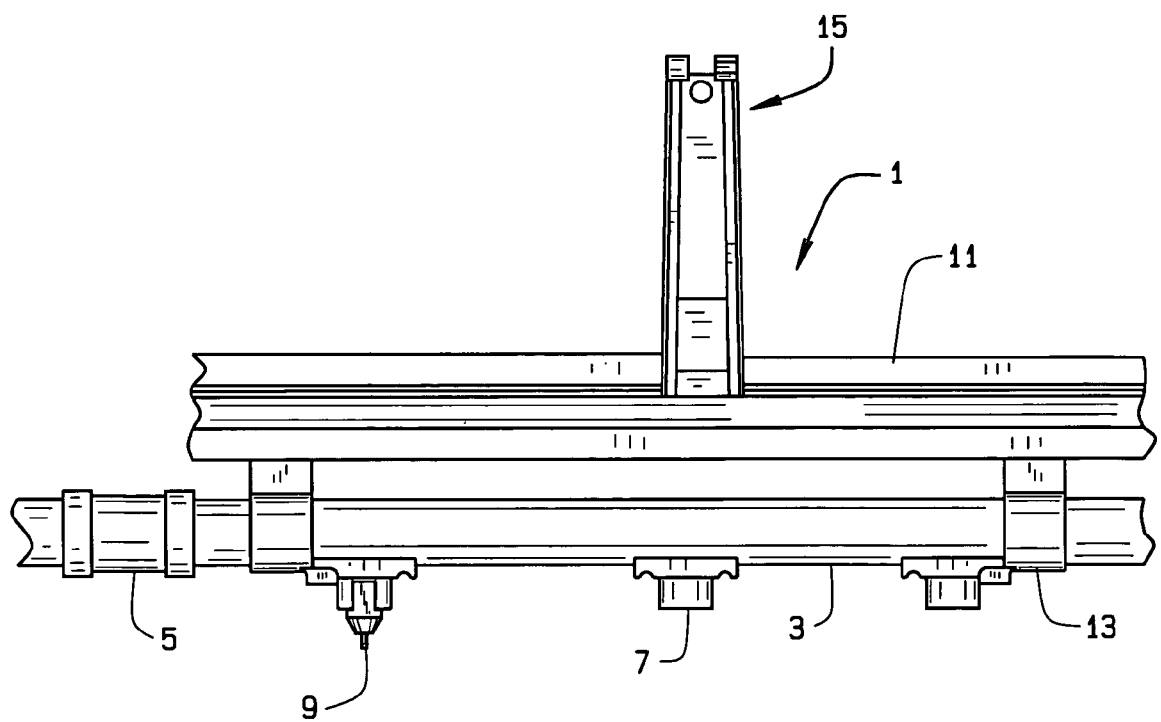
FIG. 5 is an elevational view of a portion of a water line of the present invention including a pipe segment, pipe coupler, and clip for connecting the pipe segment to the an inverted Y-shaped stabilizer bar.

A watering line 1 of the present invention for use in an animal watering system is shown generally in FIG. 5. The watering line 1 includes a plurality of pipe segments 3 (only one of which is shown) which are placed in fluid communication with each other by means of couplers 5. The pipe segments 3 each include a drinker saddle 7 in which a drinker 9 is mounted. The pipe segments 3, and hence the watering line 1, are connected to a stabilizer bar 11 in the shape of an inverted Y by means of clips 13. Hangers 15 (only one of which is shown) are provided to suspended the stabilizing bar, and hence the watering line 1, from support members (not shown) in an animal house by cables (not shown).

As can be appreciated from the discussion above, in assembling a water line of an animal drinking system, it is essential that the drinker saddles (and hence drinkers) are all substantially vertical and aligned with each other. As discussed below, the coupling system of the present invention assures that the drinker saddles (and hence drinkers) of the pipe segments 3 of the watering line are all aligned (i.e., at the same rotational position). Further the coupling system positively fixes the rotational position of the pipe segments relative to each other, so that, once the water line is assembled, the animals cannot cause individual pipe segments in the water line to rotate out of position. Additionally, the clips 13 assure that the hang points of the hangers (i.e., where the cable is connected to the hanger (or hanger section) is 180° opposite the drinkers, so that the drinkers pins will all be substantially vertical. Lastly, as will become apparent, the watering line can be assembled and connected to the stabilizing bar substantially without the use of tools. Hence, what is presented is an easy to assemble watering line, which substantially reduces the difficulty presently encountered in assembling watering lines in animal watering systems while assuring the proper position of the drinkers along the entire length of the watering line.

A first illustrative example of a pipe coupling system 20 of the present invention is shown in FIGS. 8–11. The water lines 1, as noted, comprise a plurality of pipe segments interconnected by couplers 21. The pipe segments 22, as seen in FIG. 8, are provided with a pair of notches 23 at opposite ends of the pipe. The notches 23 are preferably spaced apart by 180°. One of the two notches 23 comprises a bottom notch, and is aligned with the drinker saddles 7 which are mounted to the pipe segment 22. If desired, one of the two notches 23 could be eliminated. Although only one end of the pipe segment 22 is shown in FIG. 8, the notches 23 are formed at both ends of the pipe segment.

For the drinkers of adjacent pipe segments to be properly aligned, the notches of pipe segment 23 must be positioned at a predetermined rotational position with respect to the drinkers. As noted, the notches 23 preferably are provided as top and bottom notches, but could be otherwise positioned, as long as the notch placement is consistent. To ensure that the notches 23 and the drinker saddles are positioned at the predetermined rotational positions relative to each other, the notches and the drinker holes 24 in the pipe segment 22 (FIG. 8) are preferably formed in a single operation. That is, the tube which is used for a particular pipe segment is positioned in a machine which, in a single operation, both forms the drinker holes 24 and the notches 23. Alternatively, the notches and holes could be formed in separate operations. For example, if the holes are formed in a first operation and the notches are formed in a second operation, in the second operation, the machine which forms the notches must engage the holes to ensure that the notches are properly positioned relative to the holes. The same would be true if the notches are formed first.

Figure 9:
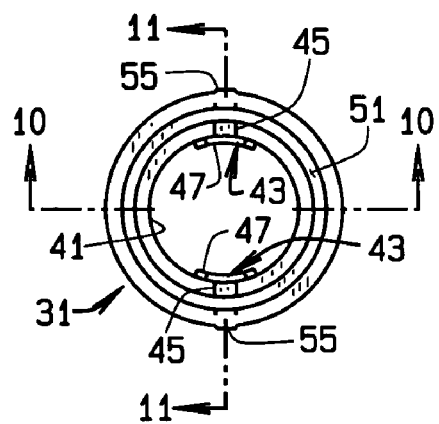
FIG. 9 is an end elevational view of the coupler.
Figure 10:
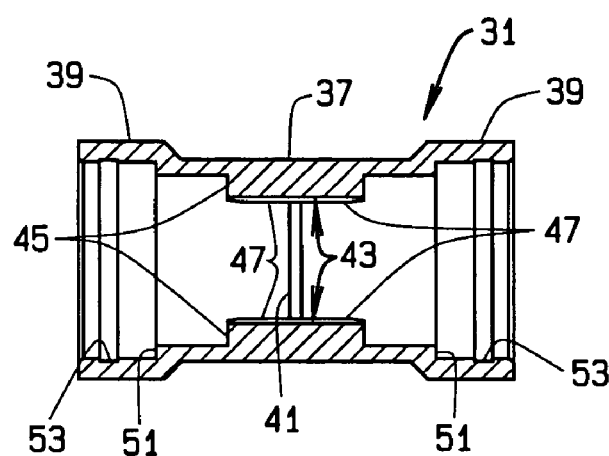
FIG. 10 is a cross-sectional view of the coupler taken along line 10—10 of FIG. 9.
Figure 11:
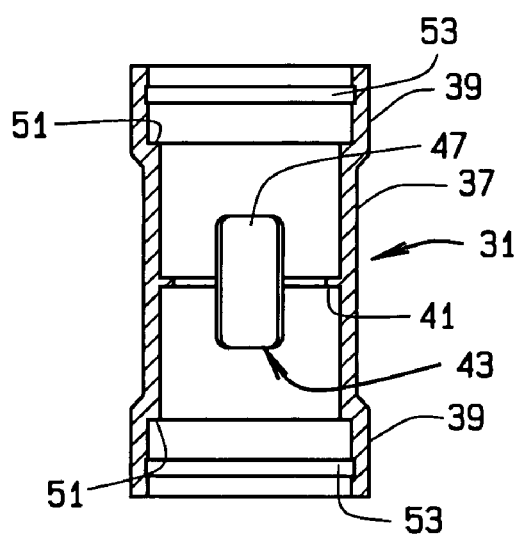
FIG. 11 and a cross-sectional view of the coupler taken along line 11—11 of FIG. 9.

The coupler or connector 21 is shown in detail in FIGS. 6–11 and includes coupler body 31, two O-rings 33, and a pair of end rings 35. The body 31 includes a central section 37 and two end sections 39. The central section 37 is of generally constant diameter and includes an inner circumferential rib 41 at the approximate center of the body 31. A pair of generally T-shaped keys 43 intersects the rib 41. The angular spacing between the two keys 43 corresponds to the spacing between the two notches 23 in the water pipe segments, and hence are preferably spaced apart 180°. The keys 43 each include a leg 45 which extends radially inwardly from the inner surface of the body central section 37, and which extends axially along the inner surface on opposite sides of the rib 41. A top 47 extends the length of the leg 45, and hence, crosses over the rib 41. The top 47 is curved, as best seen in FIGS. 7 and 9. The curvature of the top 47 corresponds to the curvature of the inner surface of the body central section 37 and to the curvature of the pipe segment 22. The height of the key leg 45 is slightly greater than the annular width of the pipe segment 22. Additionally, the length of the key leg from either end of the leg to the rib 41 is slightly shorter than the length of the pipe segment notch 23.

The body end sections 39 have a diameter greater than the diameter of the body central section 37, and hence, a shoulder or step 51 is formed at the junction between the body central and end sections. An annular or circumferential channel 53 is formed on the inner surface of each end section 39 between the shoulder 51 and the outer ends of the body 31. Additionally, positioning guides 55, in the form of short ribs or projections, extend axially along the outer surface of each end section. Preferably, each end section includes two positioning guides. The angular position of the positioning guides on the end sections corresponds to the angular position of the keys 43, as best seen in FIG. 9. Thus the positioning guides 55 facilitate assembly of the pipe segment to the connector by enabling the assembler to know the position of the keys 43 within the coupler. Although the positioning guides 55 are formed on the outer surface of the end sections 39, the positioning guides could also be formed on the outer surface of the central section 37, or even on the outer or end edges of the body. Additionally, the positioning guides could be formed as small notches, dimples, or any other marking which will inform the assembler of the angular position of the keys 43 within the coupler.

The end rings 35 have an outer diameter sized to enable the rings 35 to be received within the end sections 39 of the coupler body 31 and an annular width substantially equal to the annular width of the step 51. Hence, when the end rings 35 are inserted in the end sections 39, the combined body and end ring form a passage from one end of the body to the other of substantially constant diameter, as seen in FIG. 6. This inner diameter of the ring 35 and coupler central section 37 is sized to slidingly receive the pipe segments 22. A circumferential rib 61 extends around the outer surface of each ring 35. The rib 61 is sized to be received in the end section channels 53. The rings 35 have an axial length less than the axial length of the end sections 39, such that when the rings are inserted in the body end sections 39, there will be a gap 65 (FIG. 6) between the inner edge of the ring 35 and the shoulder 51. The O-rings 33 are received in the respective gaps 65 in the opposite end sections 39.

To assemble the coupler, the O-rings 33 are inserted in the end sections 39, and then the end rings 35 are inserted into the end sections to hold the O-rings in place. The reception of the end ring rib 61 in the end section channel 53 creates a snap fit between the end ring 35 and the body end sections 39. Hence, the end ring 35 will not come out of the coupler body 31 unless pried out. Although the snap fit of the end ring into the body end section, as described, is preferred, the end ring could be threaded into place. Alternatively, the body could be formed without the enlarged diameter end sections, and thus have a constant diameter from one end to the other. In this instance, an O-ring channel would be formed on the inner surface of the body.

To assemble the water line 3, a coupler 21 is positioned on the end of a pipe segment 22. The positioning guides 55 on the coupler 21 are aligned with the notches 23 in the pipe segment to facilitate placing the coupler 21 on the pipe segment 22. The coupler 21 is slid over the pipe segment until the pipe segment 22 contacts the circumferential rib 41. As this occurs, the pipe notches 23 pass around the key 43 in the coupler. That is, the key leg 45 extends into the notch 23, and pipe segment 22 is sandwiched between the key cap 47 and the inner surface of the coupler body 31. A second pipe segment is then placed on the other end of the coupler 21. In this instance, the pipe notches 23 are aligned with the positioning guides 55 to facilitate assembly of the second pipe segment 22 into the coupler 21. This second pipe segment is then inserted into the coupler 21 so that its notches 23 extend around the key arm 45. This process is continued until a water line 3 of a desired length is reached. The O-rings 33 are sized to form a liquid seal between the coupler and the pipe segments.

As can be appreciated, because the pipe segment notches 23 are formed at a predetermined position relative to the pipe openings over which the drinker saddles are positioned, the drinker saddles, and hence the drinkers, of each pipe segment will be rotationally aligned. This is accomplished without the need for the assembler to use tools, and without the need for the assembler to visually align the drinkers, or drinker saddles, as is required by the currently used components, as described above. Additionally, the interaction of the pipe segment notches 23 and the coupler keys 43 prevent the pipe segments 22 from rotating relative to the coupler 13. Hence, the pecking of the birds at the drinkers, or the birds simply passing under the watering line will not affect the rotational position of one pipe segment relative to the remaining pipe segments in a watering line.

Figure 12:
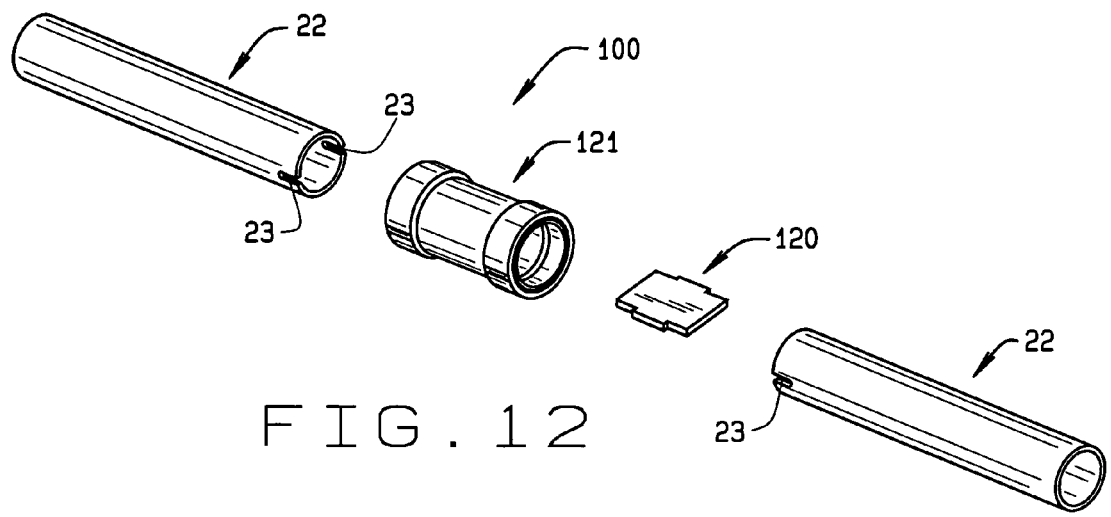
FIG. 12 is an exploded view of a second illustrative embodiment of the pipe coupling system of the present invention for coupling and rotationally fixing two pipe segments together in a predetermined rotational aligned position.
Figure 13:
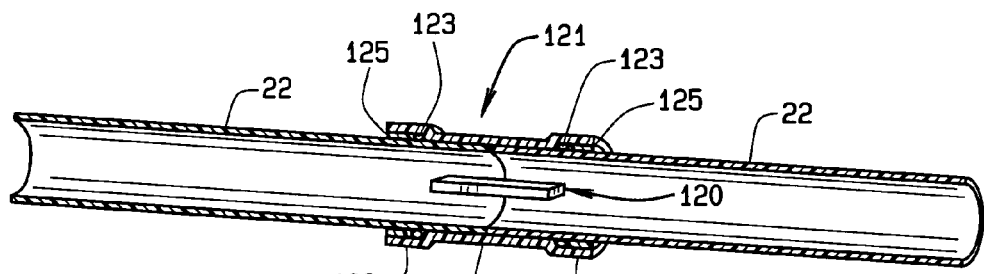
FIG. 13 is a cross-sectional view of the coupler system of FIG. 12.
Figure 14:
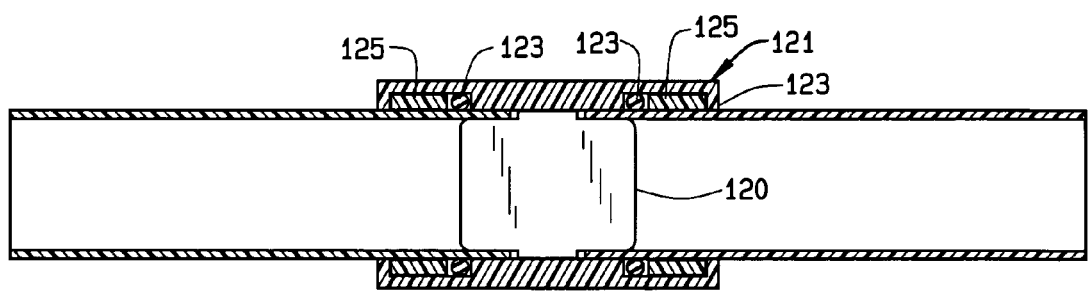
FIG. 14 is a cross-sectional view of the of the coupler system of FIG. 12 taken at 90° relative to the cross-section of FIG. 13.

A second illustrative example of a pipe coupling system 100 of the invention is shown in FIGS. 12–15. This second pipe coupling system uses the same pipes or tubes, namely, the pipes or tubes 22 having the oppositely disposed slits 23. However, the coupler 31 has been replaced with key or plate 120 and a standard coupler 121. The coupler 121 is preferably a coupler, such as is available from Cumberland Poultry Systems of Assumption, Illinois under the product designation CW-5020. This coupler, as seen in FIG. 13 comprises a central section 127 and opposed end sections 129. The end sections 129 are of slightly greater diameter and receive end rings 125. The end rings 125, like the rings 35, have an axial length less than the axial length of the end sections 129, to define a groove which receives an O-ring 123 which seals against the outside of the piping 22. The end rings 125 and the coupler central section 127 have inner diameters which are substantially the same. Hence, when the end rings 125 are received end sections 129, the coupler 121 defines a tube having a substantially constant inner diameter. Unlike the coupler 31, the coupler 121 has a smooth inner surface. That is, there are no ribs, or other structures which extend into the coupler bore from the coupler's inner surfaces.

Figure 15:
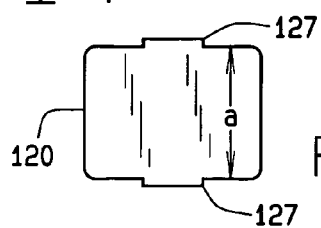
FIG. 15 is plan view of a coupler plate of the coupler system of FIG. 12.

The plate 120, as seen in FIG. 15 is a generally rectangular plate having a height dimension "a" which is sized to allow the plate to be received within the tubing 22. Hence, the dimension "a" is slightly smaller than the inner diameter of the tubing 22. The plate 120 includes a pair of ears 127 which extend from the top and bottom of the plate 120. The ears 127 have a height slightly less than the annular width of the wall of the pipe segment 22 such that the height of the plate from ear-to-ear is slightly less than the outer diameter of the tubing 22. The ears 127 each have a width sized to allow the ears to be received in the tubing slots 23. The overall length of the ears 127 can be less than twice the length of the tubing slot 23 to enable the ends of adjacent tubes to abut each other when connected together. Alternatively, the ears 127 can have a length equal to, or slightly greater than, twice the length of the slots 23, such that a small gap will be formed between adjacent tubes within the coupler 121.

To use the coupling system of FIGS. 12—12, the plate 120 is first positioned in a first of the two adjacent tubes 11 by sliding the ears 127 of the plate into the tube's slot 15. The coupler 121 is then positioned about the tube 11, either by sliding the tube into the coupler 121 or by sliding the coupler over the tube. In either event, the end of the tube is preferably positioned to be approximately midway along the length of the coupler. The second tube 11 is then inserted into the coupler so that the slots 15 of the second tube receive the ears 127 of the plate 120. As can be appreciated, the plate 120 will rotationally align the adjacent tubes, so that, for example, in a poultry watering system, the drinkers will all be at the same rotational position relative to the tubing. In order to avoid the plate 120 from potentially interfering with placement of drinkers, the plates are preferably positioned to be horizontally oriented in the completed water line, such that the plane of the plates 120 will be generally perpendicular to the plane in which the drinkers are positioned. It will be appreciated, however, that the plates could be placed at any angular position, so long as they rotationally align the tubes 22.

Figure 16:
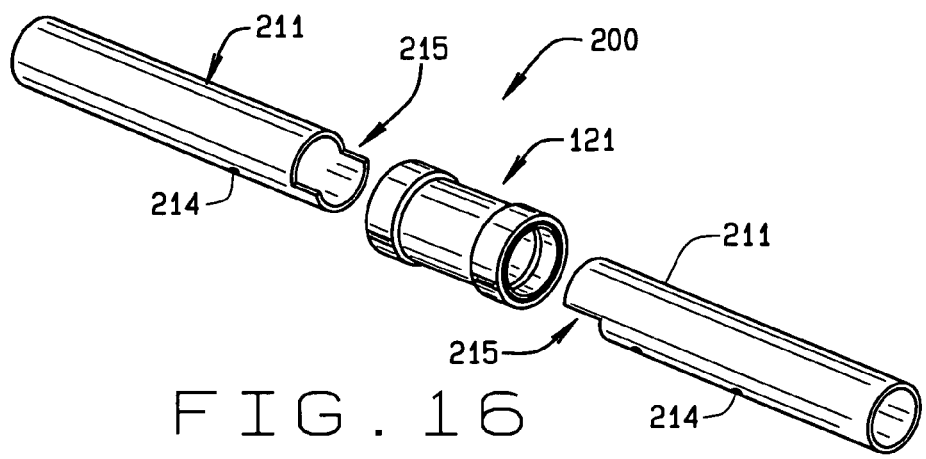
FIG. 16 is an exploded view of a third illustrative embodiment of a coupling system for coupling and rotationally fixing two pipe segments together in a predetermined rotational aligned position.
Figure 17:
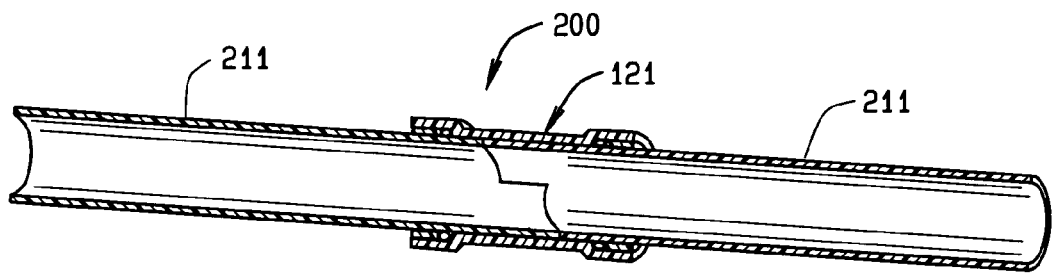
FIG. 17 is a cross-sectional view of the coupling system of FIG. 16.

A third illustrative embodiment of a coupling system 200 of the present invention is shown in FIGS. 12 and 13. This coupling system uses the same type of standard coupler 121 as described above with respect to the embodiment of FIGS. 8–11. However, rather than using a plate (such as plate 120) or projections (such as the projection 43) to align the pipe segments, the pipe segments are self aligning. As seen, the pipe segments 211 have end formations 215 which are define, as seen, semi-circular sections. To ensure that the drinker holes 214 of adjacent pipe segments are rotationally aligned, the pipe segment has left and right end formations, and the two end formations are rotationally offset from each other to ensure that the pipe segment drinker holes 214 of adjacent pipe segments are rotationally aligned. The illustrative example of FIG. 16 shows the end formations 215 defining semi-circular sections. The end sections can be formed, for example, by removing the top portion of the right end of the pipe segment and the bottom portion of the left end of the pipe segment. The two pipe segments will fit together, as seen in FIG. 17, such that their end sections mesh together. The meshing of the two end sections will rotationally fix two adjacent pipes relative to each other. Although the pipe segments 211 are shown with semi-circular end formations, it will be appreciated that the end formations can have other configurations. For example, the end formations can be in the form of rectangular teeth (or crenellations), triangular teeth, or any other shape which will allow the end formations of two adjacent pipe segments to mesh together and which will form an interference fit to prevent the rotation of one pipe segment relative to its adjacent pipe segment. As with the pipe segments 22, the end formations 215 of the pipe segments 211 are formed at a predetermined position relative to the pipe drinker holes. Hence, the end sections 215 are preferably formed at the same time the drinker holes 214 are formed in the pipe segment. Additionally, the two end formations are formed at the same time, or at least in the same machine, so that the rotational position of the pipe segment is not altered between the forming of the two end formations. This will ensure that the two end formations are off set from each other by the proper and predetermined amount so that when two pipe segments are connected, the meshing of the pipe end formations will ensure that the drinker holes 214 of the adjacent pipe segments (and hence the drinker holes of all the pipe segments in a watering line) will be rotationally aligned.

Figure 18:
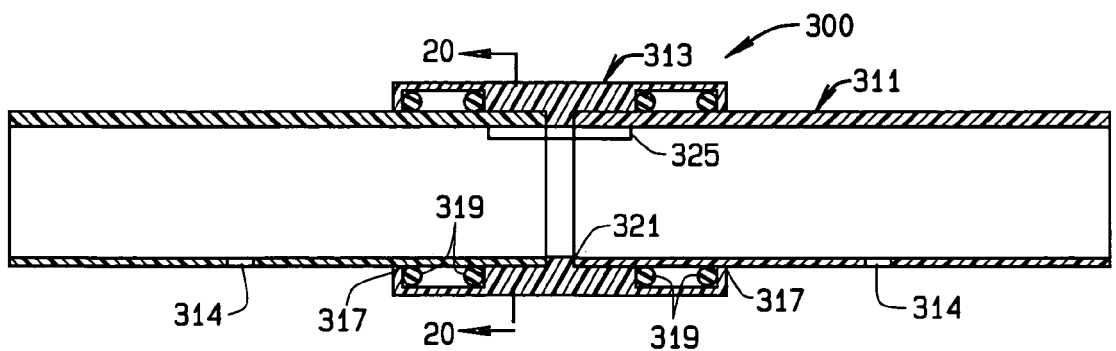
FIG. 18 is a cross-sectional view of a fourth illustrative coupler system for use in coupling and rotationally fixing two pipe segments together in a predetermined rotational aligned position.
Figure 19:
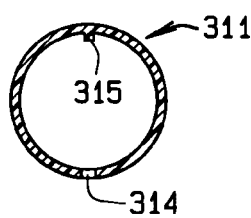
FIG. 19 is a water pipe used with the coupling system of FIG. 18.
Figure 20:
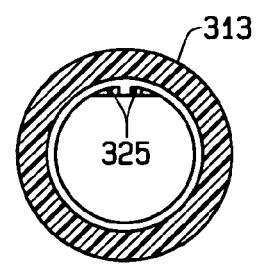
FIG. 20 is a cross-sectional view of the coupler system of FIG. 18 taken along line 20—20 of FIG. 18.

A fourth illustrative example of a pipe coupling system of the present invention is shown in FIGS. 18-20. In the system 300, the water pipe segment 311 is provided with a rib 315, which as shown in FIG. 19, is an internal rib. The rib 315 can extend the full length of the pipe segment 311, or can extend a short distance inwardly from the opposite ends of the tube. As can be appreciated, having the rib extend the full length of the pipe allows for producing the pipe segments 311 by extrusion. The drinker openings 314 are formed at a predetermined rotational position relative to rib 315. The coupler 313 has an inner diameter slightly greater than the outer diameter of the tube 311, to enable the tube 311 to be received in the coupler 313.

The coupler 313 includes grooves 317 to receive O-rings 319. The coupler is shown with two spaced apart O-rings in each groove 317. As can be appreciated, the coupler includes an end ring (not shown) which is received in the groove and functions to hold the two O-rings in their spaced apart position. Although two O-rings are shown, one O-ring or three or more O-rings could be provided at each end of the coupler if desired. As can be appreciated, the O-rings are sized to form a fluid tight seal between the outer surface of the tubes 311 and the coupler 313. The coupler 313 also includes a stop 321 extending inwardly from the inner surface of the coupler. Preferably, the stop 321 is positioned about midway between the opposite ends of the coupler. The stop 321 has a radial width slightly greater than the width of the wall of the tubing 311. The stop 321 is shown as a circumferential rib, but could be formed as a series of discrete projections.

A pair of spaced apart fingers 325 extend axially from each side of the stop 321. Thus, there are four fingers 325, two on each side of the stop 321. The fingers 325 of each pair of fingers are spaced apart circumferentially a distance slightly greater than the radial width of the tube rib 315. Additionally, the fingers 325 are spaced radially from the inner surface of the coupler by a distance slightly greater than the width of the wall of the tubing 311. Hence, the tubing wall fits between, or is sandwiched by, the fingers 325 and the inner surface of the coupler 313. Additionally, the tubing rib 315 fits between the fingers 325 of the coupler. As can be appreciated, the fingers 325 of the coupler define a groove or slot into which the tube rib 315 is received.

This rib-and-slot configuration can be formed in other ways as well. For example in FIG. 21A, the tube 311' is formed to include a pair of ribs 315', and the coupler includes a single finger 325'. In FIG. 21B, the inner surface of the tube 311" is thickened and defines a slot or groove 315" and the coupler, again, includes a single finger 215'. The tube coupling system 300 of FIGS. 18–20 could also be formed with a rib on the outer surface of the tubing 311. In this instance, the a slot or groove would be formed in the inner surface of the coupler. Alternatively, the rib could be provided on the inner surface of the coupler and a slot or groove could be provided on the tubing. This would be similar to the embodiment of FIG. 7, however, the slot would not extend fully through the tubing wall.

In using the coupling system 300, the pipe segment rib 315 is received between the coupler fingers 325 to rotationally fix the two pipe segments relative to each other. In FIGS. 21A and 21B, the tube ribs 315', 315" define a groove which receives the coupler finger 325', 325". As with the coupling systems 20, 100, and 200 (and as noted above) the pipe segment ribs are formed at a predetermined rotational position relative to each other. Actually, because the rib is extruded with the pipe segments, the drinker openings 314 are formed after the rib is formed, hence the drinker openings are formed at a predetermined rotational position relative to the rib 315. This will ensure that, as the pipe segments are aligned, the drinker holes (and hence the drinkers) are all rotationally aligned.

A fifth embodiment of the coupling system is shown in FIGS. 22–23. In the coupling system 400, the water pipe 411 is provided with at least one rib 415 extending inwardly from the inner surface of the pipe 411. The rib 415 extends inwardly from the ends of the tube 411 and is provided with a hole 416 which extends at least partially into the rib, and which opens at the ends of the tube 411. The rib 415 and its hole 416 can both extend the full length of the pipe segment. This would allow for the pipe segments to be formed by extrusion. The coupler 421 includes an internal rod 423 which is spaced from the inner surface of the coupler by a rib 425, to allow for the rod 423 to be axially aligned with the pipe rib 415 and rib bore 416. The rib 425, as can be appreciated, also serves as a stop to define a predetermined size spacing between adjacent pipe segments 411. The rod 423 can be sized to be received in the pipe segment rib hole 416, and hence, the coupler rib will rotationally align and fix to pipe segments relative to each other. Although shown as a continuous rib, the coupler rib 425 can comprise discrete rib sections. Alternatively, as seen in FIG. 22, the coupler rod can be hollow, and a pin 427 can extend between the coupler tube 428 and the pipe segment rib 415. As a further alternative, a standard pipe coupler, such as pipe coupler 121 could be used. In this instance, the two adjacent pipe segments will abut each other, and the pin 427 will extend between the holes 416 in the two adjacent pipe segment ribs. In a further alternative to this fifth embodiment of the coupling system, the pipe segments could be made with thicker walls, and the walls could be provided with one or more bores which extend axially into the pipe wall from the ends of the pipe. The pin could be received in the aligned bores of adjacent pipes to rotationally align two adjacent pipe segments.

As can be appreciated, the above described coupling systems provide easy methods for aligning tubing. Additionally, the coupling systems rotationally align the pipe segments of a water line so that the drinker holes of the various pipe segments are all aligned. The individual pipe segments are also rotationally fixed relative to each other, such that the pipe segments cannot be rotated relative to each other. The coupling system is also used to connect or couple the water pipe segments to the regular, to sight gauges/flush tubes, and to end or flush hoses. The regulators and sight gauges, when positioned along the waterline, as oppose to at an end of the waterline, function as couplers, to place pipe segments on opposite sides of the regulators or sight gauges in fluid communication with each other. Numerous other arrangements can be employed to rotationally align and fix adjacent watering pipe sections relative to each other. What is required, is that the watering pipe segments include an element, such as a pin, finger, hole or the like, which engages a mating part either on the coupler or the adjacent pipe section, and that these elements be placed in a predetermined location on the pipe segments relative to the drinker holes.

As can be appreciated, when regulators and air vents/sight gauges are positioned between the ends of the water line, the drinkers on opposite sides of such regulators and sight gauges need to be aligned. The use of the coupling systems described above accomplishes this. That is, the regulator, air vent/sight gauge, and any other component of the watering system which is incorporated into the watering line is provided the ribs, fingers, slots, openings, etc. as described above so that the drinkers on opposite sides of the components can be properly aligned. Although the invention is described with respect to watering systems for poultry, it will be appreciated that the coupling system of the invention has broader applicability, and can be utilized in any fluid system in which tubing has to be rotationally aligned. Such systems include, but are not limited to, sprinkler systems for buildings, or any other system in which fluid carrying pipes include attachments which need to be aligned along the length of the fluid line.

As the water line 3 is being assembled, the pipe segments are connected to either the stabilizing bar 11 (FIG. 5) by clips 13. Turning initially to FIG. 24 the stabilizing bar 11 is in the shape of an inverted "Y" and includes a stem 512 which extends upwardly. A hanger H is slidable along the stabilizing bar stem 512. As is known, a cable can be connected to a hang point P on the hanger to suspend the stabilizing bar, and hence the watering line, from a suspension member. An inverted "V" extends from the bottom of the stem 512 and includes a pair of arms 514 which extend downwardly from the bottom of the stem 512 and away from each other. Generally vertical arms 516 extend downwardly from the bottom of the arms 514. The arms 516 each include a shoulder 518 at the bottoms of the arms. The shoulders 518 of the two arms are co-planar and extend towards each other. The stabilizing bar 11 and hanger H are commonly available items, and are available, for example, from Cumberland Poultry Systems of Assumption, Illinois.

The stabilizing bar 11 is generally provided in sections. The sections of the stabilizing bar are assembled together using connectors (not shown). The connector comprises a bottom generally U-shaped members which extends across the bottom of the bar 11 and engages the outer surfaces of the generally vertical arms 516 and the underside of the shoulders 518. The connector also comprises an upper plate which spans across the inside of the stabilizing bar to rest on the upper surfaces of the shoulders 518 and presses against the inner surfaces of the arms 516. The two portions are then tightened together by means of fastening elements, such as bolts. Preferably, two bolts are used, there being one bolt for each of the adjacent stabilizing bar sections that are being connected together. The stabilizing bar connector sandwiches the shoulders of adjacent stabilizing bars both horizontally (i.e., from side to side) and vertically (i.e., from the upper and lower surfaces of the shoulders) to assure that the two adjacent stabilizing bars are linearly aligned. This will assure that the water pipe sections suspending from the stabilizing bar sections will also be aligned.

Turning to FIGS. 25 and 26, the saddle 600 used to mount the drinkers to the pipe segments is shown. The saddle 600 includes a mounting block or base 602 having a bottom surface 604 from which a cylinder 606 extends. The cylinder is hollow and is placed in communication with the pipe segment 11 via an opening 608. The cylinder, receives a drinker 610. The mounting block 602 is longer than the diameter of the cylinder 606 to define shoulders 612 on opposite sides of the cylinder 606. A groove 614 is formed in each shoulder. The groove 614 extends generally perpendicularly to the axis of the pipe segment 22.

The clip 13 of the present invention is shown in detail in FIGS. 27A–D. The clip 13 includes a ring section 702 which defines an arc of at least 180°, and preferably, about 140° to about 145°. The arc defined by the ring has a diameter sized to receive the pipe segment 22. Hence, for a pipe segment having a nominal outer diameter of about 1", the ring section 702 of the clip has a nominal diameter of about 1" so that the ring can slide over the pipe segment. Additionally, the clip is made from a flexible material, such that the clip can be radially slid radially onto the pipe segment (i.e., between drinkers). In this instance, the ring section 702 will expand as it is urged radially over the pipe segment, and, once the ring opening is past the diameter of the pipe segment, the ring will snap onto the pipe segment. An arm 704 extends upwardly from the two ends of the ring section. Each arm 704 includes an outwardly extending barb 706. Each barb 706 includes a sloped upper surface 708 and a bottom surface 710 which is generally perpendicular to the arm 704. A rib 712 extends outwardly from the arm 704 spaced below the barb bottom surface 710 to define a gap 714 between the barb and the rib. As can be appreciated, the distance between the outer surfaces of the clip arms 704 is only slightly less than the distance between the inner surfaces of the shoulders 518 of the stabilizing bar, and the stabilizing bar shoulders are received in the gap 714 between the clip arm rib and barb. To connect the clip 700 to the stabilizing bar 510, the clip arm barbs 708 are urged between the stabilizing bar shoulders 518. As the barbs pass the stabilizing bar shoulders, the clip arms 704 will flex toward each other. When the barbs pass the shoulders, the arms 704 will spring outwardly, and the stabilizing bar shoulders will be received in the gaps 714 between the barb 706 and the rib 712.

At the base of its ring section 702, the clip 700 includes a boot 720 that extends outwardly and downwardly from a forward surface of the ring section 702, as best seen in FIG. 25. The boot 720 includes a bottom surface 722, side surfaces 724, a back surface 726, and a front surface 728 which define a pocket 730. The front surface 728 is slightly shorter than the side surfaces 724 and has a rounded or radiused upper edge 732. As shown in FIG. 26, the radius of the upper edge is sized to correspond to the radius of the groove 614 in the drinker saddle shoulder 612, and the boot pocket is sized and shaped to receive the outer wall of the saddle shoulder 612.

As seen in FIGS. 25 and 26, the clip boot 720 positively engages the drinker saddle 600, and hence the pipe segment 22. With the clip arms 704 positively engaging the stabilizing bar 11, the pipe segment is positionally fixed relative to the stabilizing bar. Stated differently, the clip 700, by its engagement with the drinker saddle 600 keys the pipe segment 11 to the stabilizer bar 510 and prevents rotation of the pipe segment relative to the stabilizer bar 510. The clip 13 also rotationally keys the pipe segment to the stabilizing bar to ensure that the hanger point P is 180° from the drinker pin.

To assembly a water line, a first pipe segment is mounted to the stabilizing bar 11 by means of one, two, or more clips 13, with the clips being mounted to the pipe segment and the stabilizing bar as described above. A second pipe segment is then connected to the first using a coupling system of the present invention, as described above. Using one, two, or more clips, this second pipe segment is then connected to the stabilizing bar 11. The clips 13 can be mounted to this second pipe segment either before or after the pipe segment is connected to the first pipe segment. Additional pipe segments are connected to the growing water line until a water line of a desired length is assembled.

As can be appreciated, the pipe segments are keyed to each other by means of the coupling system or mechanism to ensure that the drinkers in a watering line are all at the same rotational position (i.e., are all rotationally aligned). Additionally, the clips 13 key the pipe segments to the stabilizing bar to ensure that the drinkers are 180° from the hang points P of the hangers H. Hence, all the drinkers will hang substantially vertically when the hangers are suspended from the house suspension members by cables. Importantly, an assembler can assemble a watering line without tools and without the need to "eye" the drinkers to make sure that the drinkers are all generally vertical and aligned.

As described above, the keying element of the pipe coupling systems are formed at a predetermined location relative to the drinker holes in the saddle. This ensures that the drinkers of the pipe segments will all be aligned. Hence, the pipe segments are keyed relative to each other. Additionally, the clip 17 keys the pipe segment relative to the hanging point, to ensure that the hanging point is 180° from the drinker pin. Hence, all the drinkers in a watering line will be substantially vertically oriented and the drinkers of the pipe segments will all be aligned with each other. Thus, as noted above, a watering line can be assembled and connected to hangers in a manner that is substantially easier than the current assembly method, all without the use of tools.

With the various pipe segment coupling systems rotationally aligning and fixing the pipe segments relative to each other, and with the clips 13 and 19 keying the pipe segments relative to the hang points, there is a proper and consistent alignment of the pipe segments along the length of the water line 3. And, this proper and consistent alignment of the pipe segments is accomplished without the need readjust or refine the rotational position of the pipe segments as they are coupled together. Due to the multiple clips that are used, the entire water line is keyed to the watering line hanger hang point. Hence, in the case of clip 13 which is fixed to stabilizing bar 11, any rotational forces imparted to the drinkers by growing birds are transmitted to the stabilizing bar 11 by means of the clips 13, and then is distributed linearly along the stabilizing bar. Although the scissors clips 19 do not frictionally engage the stabilizing bar 17, any such rotational forces will be transmitted in part to the stabilizing bar, but will also be transmitted along the length of the watering line. Thus, the individual pipe segments will not be rotated relative to each other by the pecking action of the birds or by the birds walking under the watering line. Therefore, as can be appreciated, the use of the clips 13 or 19 and the pipe segment coupling system, the pipe segments are keyed and rotationally fixed relative to each other and to the hang point. Hence, the watering line, including the pipe segments, the clips, and the stabilizing bar become in effect, a single structure, and forces applied to this structure are distributed along the structure to prevent any portion of the structure from being rotated relative to any other portion of the structure.

As various changes could be made in the above constructions without departing from the scope of the invention, it is intended that all matter contained in the above description or shown in the accompanying drawings shall be interpreted as illustrative and not in a limiting sense. For example, the key of the coupler 21 of the coupling system 20 could be made without the cap 47, such that the key 43 forms a rib extending axially along the inner surface of the coupler body 31 from the circumferential rib 41. The rib 41 acts as a stop to prevent the pipe segments 22 from extending too far into the coupler 21. Inasmuch as it is acting as a stop, the rib 41 does not need to be continuous, nor does it need to extend fully around the inner circumference of the coupler body 31. Further, the rib 41 could be eliminated, and the keys 43 could be relied upon to act as stops to prevent pipe segments from being inserted too far into the coupler. To key the pipe segments to the stabilizing bar, the pipe segments could include a projection independent or separate from the drinker mounts 600 and which would engage the clip pocket. Although the clips 13 are shown to outwardly extending barbs and the stabilizing bar 11 is shown to have inwardly extending shoulders, the directions could be reversed, such that the stabilizing bar shoulders extend outwardly and the clip barbs extend inwardly. Further, although the clips 13, 19 key the pipe segments to the hang points such that the drinker pins are 180° from the hang points, the clips could be formed such that the pins (or other type of attachment for a fluid line) is at some other desired orientation relative to the hanger points or stabilizing bars. These examples are illustrative only.

The invention claimed is:

1. A watering system for a poultry house, the watering system comprising:
    a watering line, said watering line comprising a plurality of pipe segments connected together by a coupling mechanism; said pipe segments each including at least one drinker opening positioned along a side of the pipe segment and an opening in the form of a slot extending inwardly from an end of said pipe segment; said coupling mechanism comprising a tube having opposed opened ends, said tube being sized and shaped to axially and slidingly receive said pipes segments in the opposed opened ends of said tube; a seal to form a fluid tight seal between said pipe segments and said tube; and a keying element which engages ends of said pipe segments; said coupling mechanism being at a predetermined location relative to said drinker opening; said coupling mechanism rotationally fixing said pipe segments relative to each other such mat the drinker openings of the pipes segments in the watering line are rotationally aligned and rotationally fixed;
    said coupling mechanism tube keying element being integral with said tube and extending from a surface of said tube; said keying element comprising a rib extending axially along a surface of said tube; said opening in said pipe segment comprising a slot extending inwardly from an end of said pipe segment; said keying element further including an axially extending can on said rib, said cap having a bottom surface which extends outwardly from opposite sides of said rib, whereby said key has a generally T-shaped configuration in end elevation, said key rib having a height slightly greater than the annular width of said pipe segment; whereby, said key cap will sandwich said pipe segment between said key can and said tube inner surface;
    a stabilizing bar, said stabilizing bar including an axially extending shoulder; and
    a plurality of clips which suspend said watering line from said stabilizing bar;
    whereby, said coupling mechanism keys and rotationally fixes said pipe segments of said water line on to another to ensure alignment of said drinker openings and to prevent rotational movement of said pipe segments relative to each other.

2. The watering system of claim 1 wherein:
    said pipe segments including a projection extending outwardly from an outer surface of said pipe segments; and
    said clips each including a pair of arms extending from said pipe receiving section; said arms defining a groove sized and shaped to engage said stabilizing bar shoulders; said clips including a pipe receiving section sized to receive said pipe segment and a boot on said pipe receiving section; said boot defining a pocket; said boot being positioned on said clip pipe receiving section to engage said pipe segment projection to positionally fix said pipe segment relative to said clip; whereby said clip keys said pipe segments to said stabilizing bar to prevent rotational movement of said pipe segments relative to said stabilizing bar.

3. The watering system of claim 2 wherein said pipe segment projection includes an outer surface and a depression formed in said outer surface; said clip boot comprising radiused surface which engages said pipe segment depression.

4. The watering system of claim 3 wherein said boot includes a back surface, front surface, side surfaces, and bottom surface defining a pocket; said boot front surface having a top edge defining said radiused surface; said projection including a portion which is received in said clip boot pocket.

5. The watering system of claim 1 wherein said coupler includes a stop on an inner surface of said coupler body; said stop being substantially perpendicular to said key; said stop being positioned in said coupler body to be positioned approximately midway along the length of said key.

6. The watering system of claim 5 wherein said stop comprises a circumferential rib.

7. The watering system of claim 1; said coupler mechanism defining a coupler body; said coupler mechanism including a key position indicator on an outer surface of said coupler body; said key position indicator having an angular position on said body corresponding to the angular position of said key within said body.

8. A tube coupling mechanism for rotationally aligning and positively rotationally fixing two adjacent pipe segments relative to each other; said coupling mechanism comprising a tube having opposed opened ends, said tube being sized and shaped to axially receive said pipes segments in the opposed opened ends of said tube; a seal to form a fluid tight seal between said pipe segments and said tube; and a keying element which engages ends of said pipe segments to rotationally align and rotationally fix adjacent pipe segments relative to each other; said keying element being integral with said tube and extending from a surface of said tube; said keying element comprising a rib extending axially along a surface of said tube; said opening in said pipe segment comprising a slot extending inwardly from an end of said pipe segment; said keying element further including an axially extending cap on said rib, said cap having a bottom surface which extends outwardly from opposite sides of said rib, whereby said key has a generally T-shaped configuration in end elevation, said key rib having a height slightly greater than the annular width of said pipe segment; whereby, said key cap will sandwich said pipe segment between said key cap and said tube inner surface.

9. The tube coupling mechanism of claim 8 wherein said cap has a curvature corresponding to the curvature of said pipe segment and said tube inner surface.

10. A tube coupling mechanism for rotationally aligning and positively rotationally fixing two adjacent pipe segments relative to each other said coupling mechanism comprising a tube having opposed opened ends, said tube being sized and shaped to axially receive said pipes segments in the opposed opened ends of said tube; a seal to form a fluid tight seal between said pipe segments and said tube; and a keying element which engages ends of said pipe segments to rotationally align and rotationally fix adjacent pipe segments relative to each other; said keying element being integral with said tube and extending from a surface of said tube; said keying element comprising a rib extending axially along a surface of said tube; said opening in said pipe segment comprising a slot extending inwardly from an end of said pipe segment; said coupler including a stop on an inner surface of said tube; said stop being substantially perpendicular to said key; said stop being positioned in said coupler body to be positioned approximately midway along the length of said key.

11. The tube coupling mechanism of claim 10 wherein said stop comprises a circumferential rib.

12. A tube coupling mechanism for rotationally aligning and positively rotationally fixing two adjacent pipe segments relative to each other; said coupling mechanism comprising a tube having opposed opened ends, said tube being sized and shaped to axially receive said pipe segments in the opposed opened ends of said tube; a seal to form a fluid tight seal between said pipe segments and said tube; and a keying element which engages ends of said pipe segments to rotationally align and rotationally fix adjacent pipe segments relative to each other; said keying element being integral said tube and extending from a surface of said tube; a key position indicator on an outer surface of said tube; said key position indicator having an angular position on said tube corresponding to the angular position of said key within said tube.

13. A coupler for rotationally aligning and rotationally fixing two adjacent pipe segments of an animal drinking system relative to each other; said pipe segments comprising a wall defining a passage through which fluid can flow, at least one fluid outlet positioned along the length of said wall; and a slot at at least one end of said wall; said coupler comprising a hollow tube defined by a wall having an inner and outer surface; said tube being sized and shaped to telescopically mate with and seal against said pipe segments; said tube comprising a key sized and shaped to engage said pipes; said key comprising at least one axially extending leg extending from said wall and an axially extending cap on said leg, said cap having a bottom surface which extends outwardly from opposite sides of said rib, whereby said key has a generally T-shaped configuration in end elevation, said key rib having a height slightly greater than the annular width of said pipe segment; said coupler leg and said slots of said pipe segments being sized and shaped such that said coupler leg engages said pipe segment slots; such that, when said pipe segments are mated with said coupler, said key cap will sandwich said pipe segment between said key cap and said tube inner surface said outlets of said two pipe sections will be rotationally aligned with each other.

14. A coupler for rotationally aligning and rotationally fixing two adjacent pipe segments relative to each other; said coupler comprising a hollow tube defined by a wall having an inner and outer surface; said tube being sized and shaped to telescopically mate with and seal against said pipe segments; said tube comprising a key sized and shaped to engage said pipes; said key comprising at two axially extending legs extending from said wall, said legs being spaced apart from each other; said key further including an axially extending cap on said leg, said cap having a bottom surface which extends outwardly from opposite sides of said leg, whereby said key has a generally T-shaped configuration in end elevation.

15. The coupler of claim 14 wherein said key cap has a curvature corresponding to the curvature of said coupler inner surface.

16. A coupler for rotationally aligning and rotationally fixing two adjacent pipe segments relative to each other; said coupler comprising a hollow tube defined by a wall having an inner and outer surface; said tube being sized and shaped to telescopically mate with and seal against said pipe segments; said tube comprising a key sized and shaped to engage said pipes; said key comprising at least one axially extending leg extending from said wall; said coupler including a stop on an inner surface of said tube; said stop being substantially perpendicular to said key; said stop being positioned in said tube to be positioned approximately midway along the length of said key.

17. The coupler of claim 16 wherein said stop comprises a circumferential rib, said key extending across said rib.

18. A coupler for rotationally aligning and rotationally fixing two adjacent pipe segments relative to each other; said coupler comprising a hollow tube defined by a wall having an inner and outer surface; said tube being sized and shaped to telescopically mate with and seal against said pipe segments; said tube comprising a key sized and shaped to engage said pipes; said key comprising at least one axially extending leg extending from said wall; a key position indicator on an outer surface of said tube; said key position indicator having an angular, position on said tube corresponding to the angular position of said key within said tube.

19. A coupler for rotationally aligning and rotationally fixing two adjacent pipe segments of an animal drinking system relative to each other;

said pipe segments comprising a wall defining a passage through which fluid can flow, at least one fluid outlet positioned along the length of said wall; and a slot at at least one end of said wall;

said coupler comprising a hollow tube defined by a wall having an inner and outer surface; said tube being sized and shaped to telescopically mate with and seal against said pipe segments; said tube comprising a key sized and shaped to engage said pipes; said key comprising at least one axially extending leg extending from said wall; said coupler leg and said slots of said pipe segments being sized and shared such that said coupler leg engages said pipe segment slots; such that, when said pipe segments are mated with said coupler, said outlets of said two pipe sections will be rotationally aligned with each other; said tube including a central section and opposed end sections, said central section defining a first diameter and said outer sections defining a second diameter greater than said first diameter; there being a shoulder formed between the central and end sections; an end ring received in each of said tube end sections; said end ring having an inner diameter substantially equal to the inner diameter of said tube central section; said end ring having an axial length less than the axial length of said end sections, whereby, a gap is formed between an inner end of said end ring and said shoulder to receive a seal.

20. The coupler of claim 19 wherein one of said tube end sections and said end rings include a groove and the other of said tube end sections and said end rings include a projection; said projection being received in said groove to snap fit said end ring into said tube end section.

* * * * *